United States Patent
Bahl et al.

(10) Patent No.: US 7,571,308 B1
(45) Date of Patent: Aug. 4, 2009

(54) METHOD FOR CONTROLLING ACCESS TO A NETWORK BY A WIRELESS CLIENT

(75) Inventors: Pradeep Bahl, Redmond, WA (US); Timothy M. Moore, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 787 days.

(21) Appl. No.: 09/607,195

(22) Filed: Jun. 28, 2000

(51) Int. Cl.
*H04L 9/00* (2006.01)

(52) U.S. Cl. ......................... 713/151; 709/227

(58) Field of Classification Search ................ 713/151, 713/153, 200, 201, 168, 150, 152; 710/200; 709/227, 225, 229; 380/271, 270, 272; 370/354, 370/356; 455/433, 410, 411
See application file for complete search history.

(56) References Cited

U.S. PATENT DOCUMENTS

| | | | | |
|---|---|---|---|---|
| 5,159,592 A | * | 10/1992 | Perkins | 370/338 |
| 5,708,654 A | * | 1/1998 | Arndt et al. | 370/242 |
| 5,854,901 A | * | 12/1998 | Cole et al. | 709/245 |
| 5,884,024 A | * | 3/1999 | Lim et al. | 726/3 |
| 5,922,049 A | * | 7/1999 | Radia et al. | 709/220 |
| 6,061,346 A | * | 5/2000 | Nordman | 370/352 |
| 6,101,182 A | * | 8/2000 | Sistanizadeh et al. | 370/352 |
| 6,147,986 A | * | 11/2000 | Orsic | 370/349 |
| 6,212,563 B1 | * | 4/2001 | Beser | 709/227 |
| 6,393,484 B1 | * | 5/2002 | Massarani | 709/227 |
| 6,434,134 B1 | * | 8/2002 | La Porta et al. | 370/338 |
| 6,466,981 B1 | * | 10/2002 | Levy | 709/227 |
| 6,510,153 B1 | * | 1/2003 | Inoue et al. | 370/354 |
| 6,535,918 B1 | * | 3/2003 | Bender et al. | 709/228 |
| 6,577,642 B1 | * | 6/2003 | Fijolek et al. | 370/465 |
| 6,614,774 B1 | * | 9/2003 | Wang | 370/338 |
| 6,678,732 B1 | * | 1/2004 | Mouko et al. | 709/227 |
| 6,684,243 B1 | * | 1/2004 | Euget et al. | 709/222 |
| 6,704,789 B1 | * | 3/2004 | Ala-Laurila et al. | 709/230 |
| 6,768,743 B1 | * | 7/2004 | Borella et al. | 370/401 |
| 6,775,553 B1 | * | 8/2004 | Lioy | 455/461 |
| 6,801,941 B1 | * | 10/2004 | Stephens et al. | 709/225 |
| 6,957,276 B1 | * | 10/2005 | Bahl | 709/245 |
| 6,970,941 B1 | * | 11/2005 | Caronni et al. | 709/238 |
| 7,023,863 B1 | * | 4/2006 | Naudus et al. | 370/401 |
| 7,028,186 B1 | * | 4/2006 | Stenman et al. | 713/173 |
| 7,133,684 B2 | * | 11/2006 | Farley et al. | 455/456.1 |
| 2001/0034831 A1 | * | 10/2001 | Brustoloni et al. | 713/151 |
| 2002/0023160 A1 | * | 2/2002 | Garrett et al. | 709/229 |
| 2003/0115345 A1 | * | 6/2003 | Chien et al. | 709/229 |

OTHER PUBLICATIONS

IPSEC Working Group Internet-draft Baiju Patel , DHCP Configuration of IPsec Tunnel Mode, See http://www.watersprings.org/pub/id/draft-ietf-ipsec-dhcp-04.txt Retrieved date Jul. 7, 2008.*

(Continued)

*Primary Examiner*—Beemnet W Dada (57) ABSTRACT

In a method for controlling access to a network by a wireless client and a network, an access point on the network receives a request for a network address broadcast by the wireless client. The request is passed to an address server, which assigns a temporary address to the wireless client and provides the address of the access point. The wireless client then initiates a secure link with the access point based on the network address assigned by the address server and the address of the access point. If the secure link is not established before the temporary address expires, then wireless client is denied access to the network.

18 Claims, 6 Drawing Sheets

OTHER PUBLICATIONS

Plummer, Network Working Group, RFC 826, An Ethernet Address Resolution Protocol or Converting Network Protocol Addresses for Transmission on Ethernet Hardware, *DCP@MIT-MC*, Nov. 1982.

Kent & Atkinson, Network Working Group, RFC 2401, "Security Architecture for the Internet Protocol," BBN Corporation, Cambridge, MA, Nov. 1998.

Harkins & Carrel, "The Internet Key Exchange (IKE), RFC 2409," Cisco Systems, San Jose, CA, Nov. 1998.

"IPSEC Implementation," downloaded from Microsoft TechNet, Microsoft.com, 1992, 1999.

* cited by examiner

METHOD FOR CONTROLLING ACCESS TO A NETWORK BY A WIRELESS CLIENT

TECHNICAL FIELD OF THE INVENTION

This invention relates generally to secure network communication and, more particularly, to using a network address and configuration assignment process to dynamically establish a secure link, such as an IPSEC tunnel, between a wireless client and a network.

BACKGROUND OF THE INVENTION

The broadcast nature of wireless communication makes it relatively easy for a person to "sniff" or monitor traffic on a wireless network to gain unauthorized access to it. One security measure that is currently available for wireless networks is requiring wireless clients to include a security code with each transmission. A problem with this measure is that there is nothing to prevent someone from ascertaining the security code by simply monitoring the transmissions from the client to the network. Another available security measure is the use of an encryption key for each group of users. However, if one member of a group compromises his or her copy of the key, or leaves the organization, then the entire group of users must be re-keyed in what is typically a time consuming process.

SUMMARY OF THE INVENTION

In accordance with the foregoing, a method for controlling access to a network by a wireless client is provided. According to the method, an access point on the network receives a request for a network address broadcast by the wireless client. The request is passed to an address server, which assigns a temporary address to the wireless client and provides the address of the access point. The wireless client then initiates a secure link with the access point based on the network address assigned by the address server and the address of the access point. If the secure link is not established before the temporary address expires, then wireless client is denied access to the network.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE PREFERRED EMBODIMENTS

Figure 1:
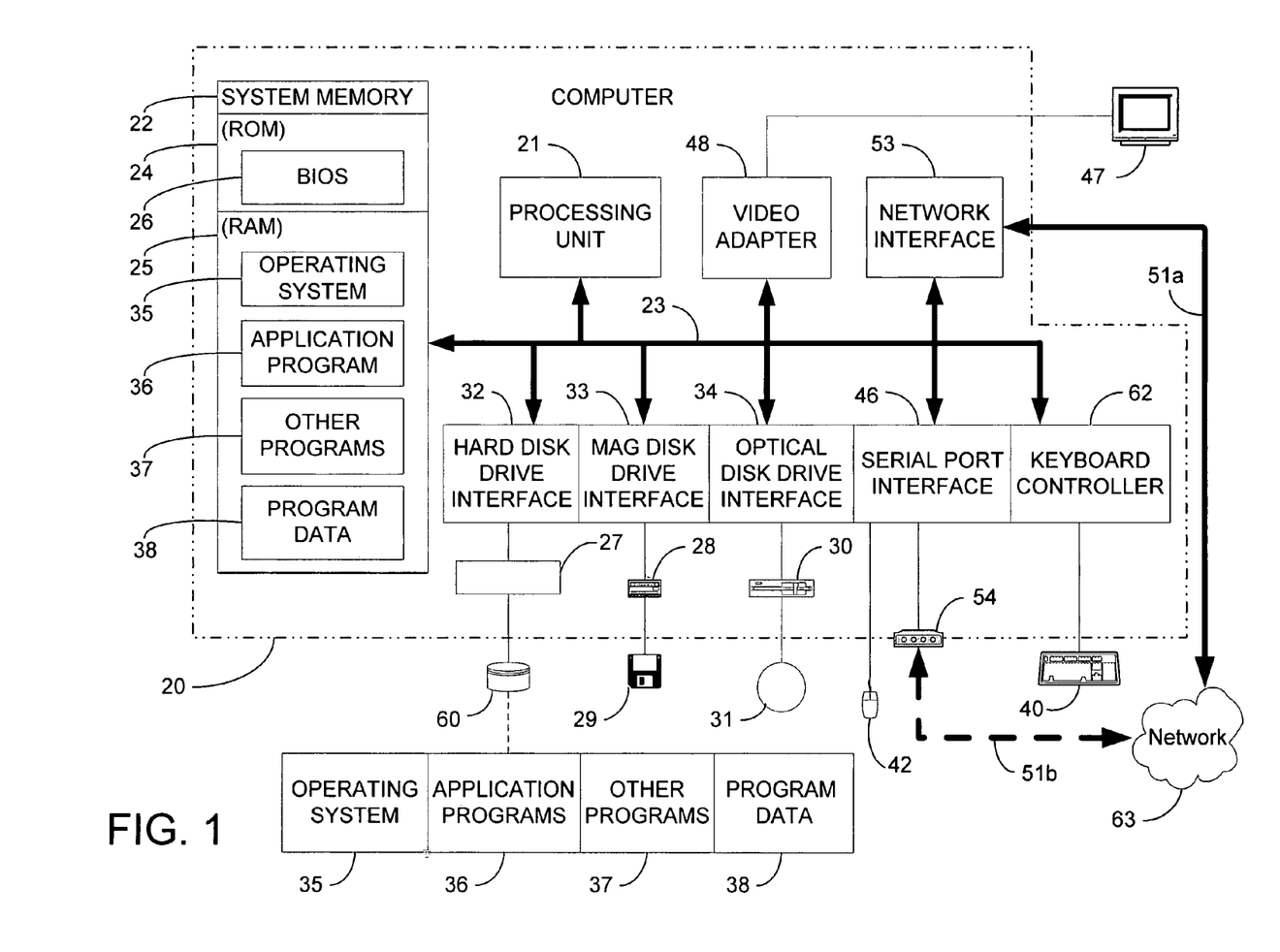
FIG. 1 is a block diagram generally illustrating an example computer environment in which the present invention may be practiced.

Turning to the drawings, wherein like reference numerals refer to like elements, an exemplary environment for implementing the invention is shown in FIG. 1. The environment includes a computer 20, including a central processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the computer 20, such as during start-up, is stored in the ROM 24. The computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, programs and other data for the computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A user may enter commands and information into the computer 20 through input devices such as a keyboard 40, which is typically connected to the computer 20 via a keyboard controller 62, and a pointing device, such as a mouse 42. Other input devices (not shown) may include a microphone, joystick, game pad, wireless antenna, scanner, or the like. These and other input devices are often connected to the processing unit 21 through a serial port interface 46 that is coupled to the system bus, but may be connected by other interfaces, such as a parallel port, game port, a universal serial bus (USB), or a 1394 bus. A monitor 47 or other type of display device is also connected to the system bus 23 via an interface, such as a video adapter 48. In addition to the monitor, computing devices typically include other peripheral output devices, not shown, such as speakers and printers.

The computer 20 may operate in a networked environment using logical connections to one or more devices within a network 63, including another computer, a server, a network PC, a peer device or other network node. These devices typically include many or all of the elements described above relative to the computer 20. The logical connections depicted in FIG. 1 include a network link, for which there are many possible implementations, including a local area network (LAN) link 51a and a wide area network (WAN) link 51b. Network links are commonplace in offices, enterprise-wide computer networks, intranets and the Internet and include such physical implementations as coaxial cable, twisted copper pairs, fiber optics, wireless, and the like. Data may transmitted over the network links 51a-51b according to a variety of well-known transport standards, including Ethernet, SONET, DSL, T-1, and the like. When used in a LAN, the computer 20 is connected to the network link 51a through a network interface card (NIC) or-adapter 53. When used in a WAN, the computer 20 typically includes a modem 54 or other means for establishing communications over the network link 51b, as shown by the dashed line. The modem 54, which may be internal or external, is connected to the system bus 23 via the serial port interface 46. In a networked environment, programs depicted relative to the computer 20, or portions thereof, may be stored on other devices within the network 63.

Those skilled in the art will appreciate that the meaning of the term "computer" is not limited to a personal computer, but includes other microprocessor or microcontroller-based systems, such as hand-held devices, multi-processor systems, microprocessor based or programmable consumer electronics, network PCs, minicomputers, mainframe computers, Internet appliances, and the like. The invention may also be practiced in distributed computing environments where tasks are performed by remote processing devices that are-linked through a communications network.

In the description that follows, the invention will be described with reference to acts and symbolic representations of operations that are performed by one or more logic elements. As such, it will be understood that such acts and operations may include the execution of microcoded instructions as well as the use of sequential logic circuits to transform data or to maintain it at locations in the memory system of the computer. Reference will also be made to one or more programs or modules executing on a computer system or being executed by parts of a CPU. A "program" or "module" is any instruction or set of instructions that can execute on a computer, including a process, procedure, function, executable code, dynamic-linked library (DLL), applet, native instruction, module, thread, or the like. In a distributed computing environment, parts of a program or module may be located in both local and remote memory storage devices. A program or module may also include a commercial software application or product, which may itself include several programs. However, while the invention is being described in the context of software, it is not meant to be limiting as those of skill in the art will appreciate that various of the acts and operation described hereinafter may also be implemented in hardware.

Figure 2:
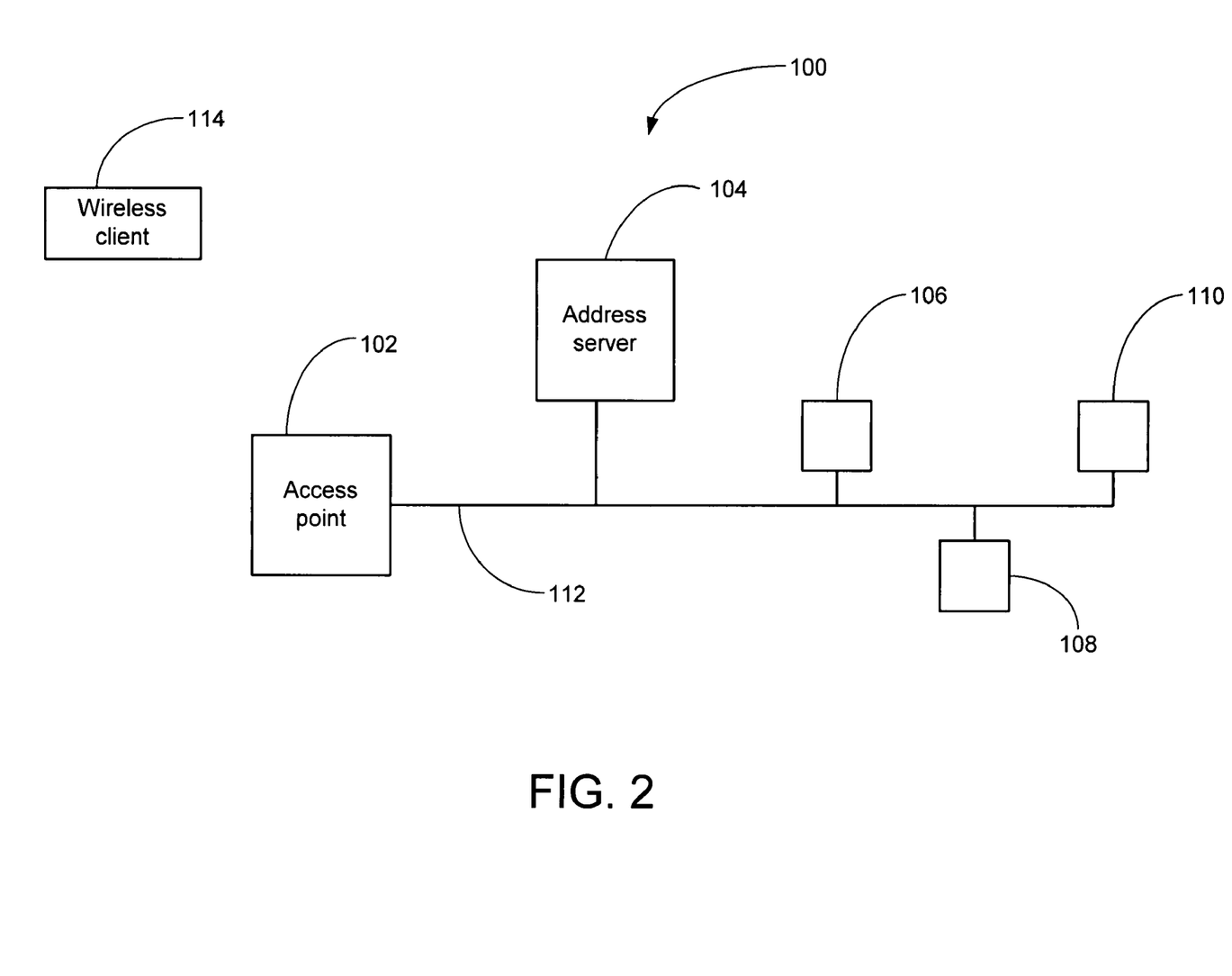
FIG. 2 generally illustrates an example network in which the invention may be practiced.

The invention is generally directed to a method for establishing secure communication with a wireless client. Referring to FIG. 2, a network set up in accordance with an embodiment of the invention is shown. The network, generally labeled 100, includes a wireless access point 102 for allowing computers to temporarily access the network 100 via a wireless link, an address server 104 for assigning addresses to devices on the network 100, and computers 106, 108 and 110. The access point 102, address server 104 and computers 106, 108 and 110 are all linked by a network link 112. The network link 112 may be any of the alternatives described in conjunction with FIG. 1, including a wireless link. Although the network 100 is depicted as relatively small to aid in the description, it is understood that the invention may be practiced on any size network. Furthermore, it is understood that there may be multiple address servers on the network as well as multiple access points.

To gain access to the network 100, a wireless client 114 requests an address from the network via a wireless medium. The address server 104 responds by assigning a short duration address to the wireless client 114, and transmitting the assignment to the wireless client 114 via the access point 102. The address server 104 also transmits the network address of the access point 102 to the wireless client 114, preferably using the same packet as the network address assignment. The wireless client then establishes communication with the access point 102 and negotiates a secure link with the access point 102. Once a secure link has been established, the wireless client sends a request to have its network address renewed to the network 100 via the secure link. The address server 104 responds by renewing the address for a relatively long duration. The wireless client 114 may then communicate with any of the computers 106, 108 and 110 via the secure link.

Figure 3:
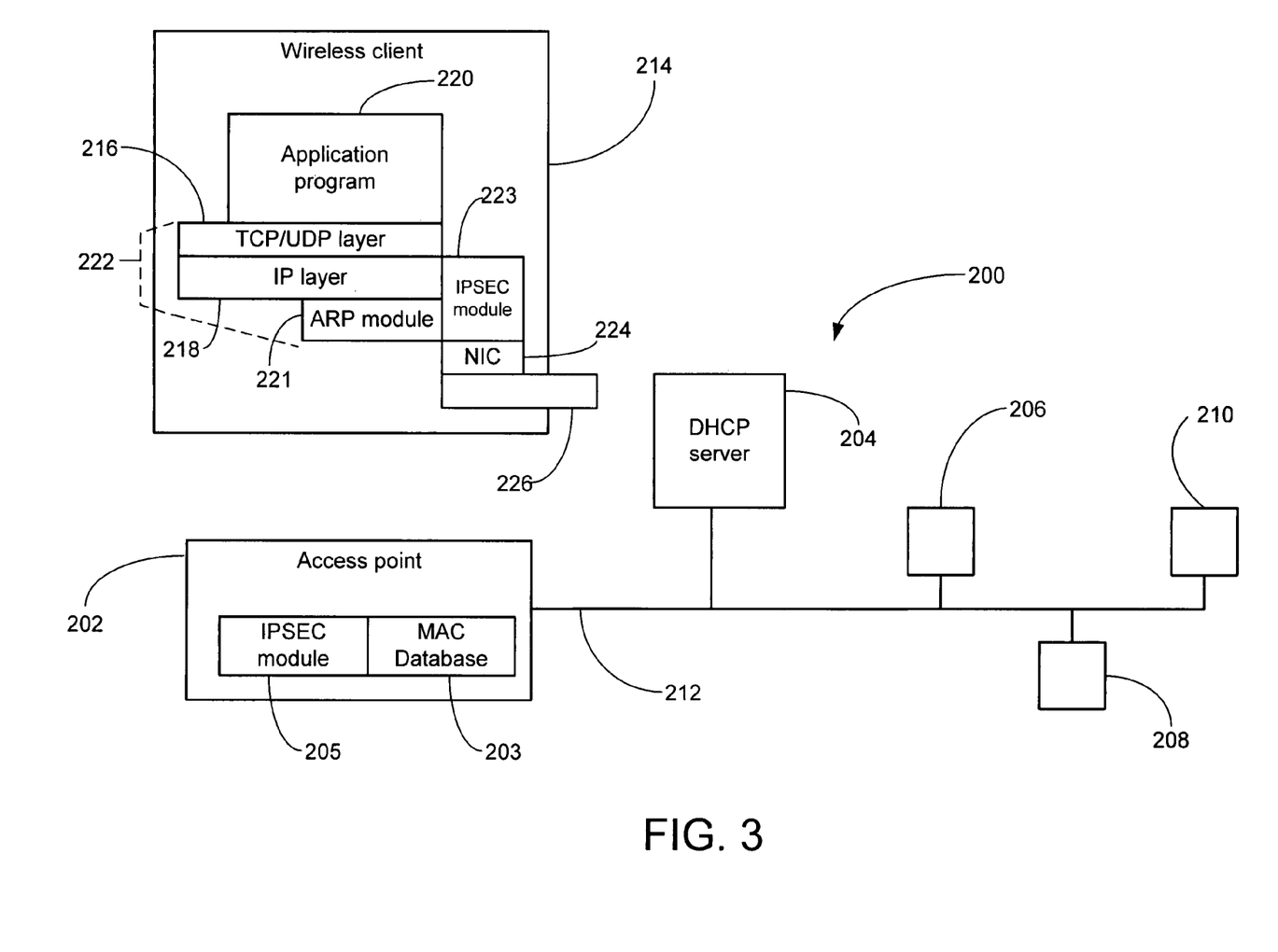
FIG. 3 generally illustrates a more specific example of a network in which the invention may be practiced.

Referring to FIG. 3, a more specific embodiment of a system set up in accordance with the teachings of the invention is shown. A network 200 includes a wireless access point 202 for allowing a computer to temporarily access the network 200 via a wireless link, a dynamic host configuration protocol (DHCP) server 204 for assigning internet protocol (IP) addresses and other network configuration values to devices on the network 200, and computers 206, 208 and. 210. The wireless access point 202 is preferably a router, but may be any type of computer. The wireless access point 202, DHCP server 204, and computers 206, 208 and 210 are all communicatively linked by a network link 212, which in the illustrated embodiment is assumed to be an Ethernet link.

The wireless access point 202 may include a database 203 containing the MAC addresses of the wireless clients that are. permitted to access the network 200 and an IP Security (IPSEC) module 205. In an embodiment of the invention, the database 203 may be generated by a network administrator. For example, if corporate employees need to access a corporate network via wireless medium, the network administrator could issue a wireless NIC to each employee and enter the MAC addresses of the cards into the database 203. The IPSEC module 205 sets up IPSEC tunnels with wireless clients. To ensure that no unauthorized users access the network 200, the access point 202 may, for example, not allow any network traffic from wireless clients to enter the network 200 unless the traffic originates from a MAC address listed in the database 203 and is either (1) transmitted through an IPSEC tunnel, (2) is a DHCP broadcast, or (3) is an initiation packet for an IPSEC tunnel, such as an OAKLEY packet. OAKLEY (also known as IKE) is a well-known key exchange protocol.

A wireless client 214 is a capable of communicating with the network 200 via a wireless medium. The wireless client 214 includes a wireless NIC 224, a wireless communicator 226, an application program 220 and a transport control protocol/internet protocol (TCP/IP) stack or module 222 having a transport control protocol/universal datagram protocol (TCP/UDP) layer 216, an internet protocol (IP) layer 218, an address resolution protocol (ARP) module 221, and an IPSEC module 223. The application program 220 sends and receives data through the TCP/IP module 222. The TCP/UDP layer 216 interprets and creates TCP and UDP headers for incoming and outgoing messages, while the IP layer 218 performs the same functions with respect to IP headers. The ARP module 221 generates ARP packets according to a well-known address resolution protocol. The IPSEC module 223 sets up security associations with other computers based on or more filter settings and encrypts or decrypts messages traveling to and from the other parts of the TCP/IP module 222. Such encryption may be carried out, for example, according to the well-known 3DES, DES, ECC, cryptographic algorithms and the like, and by using keys established as a result of Security association setup through the OAKLEY protocol. The IPSEC module 223 may also authenticate packets within messages using one or more well-known authentication algorithms, such. as MD5 and SHA1. The NIC 224 acts as an interface between the TCP/IP module 222 and the communicator 226. Although not shown, the access point 202 may also have a TCP/IP module, wireless NIC, and a wireless communicator whose functions are similar to those of the TCP/IP module 222, NIC 224 and communicator 226.

Figure 4:
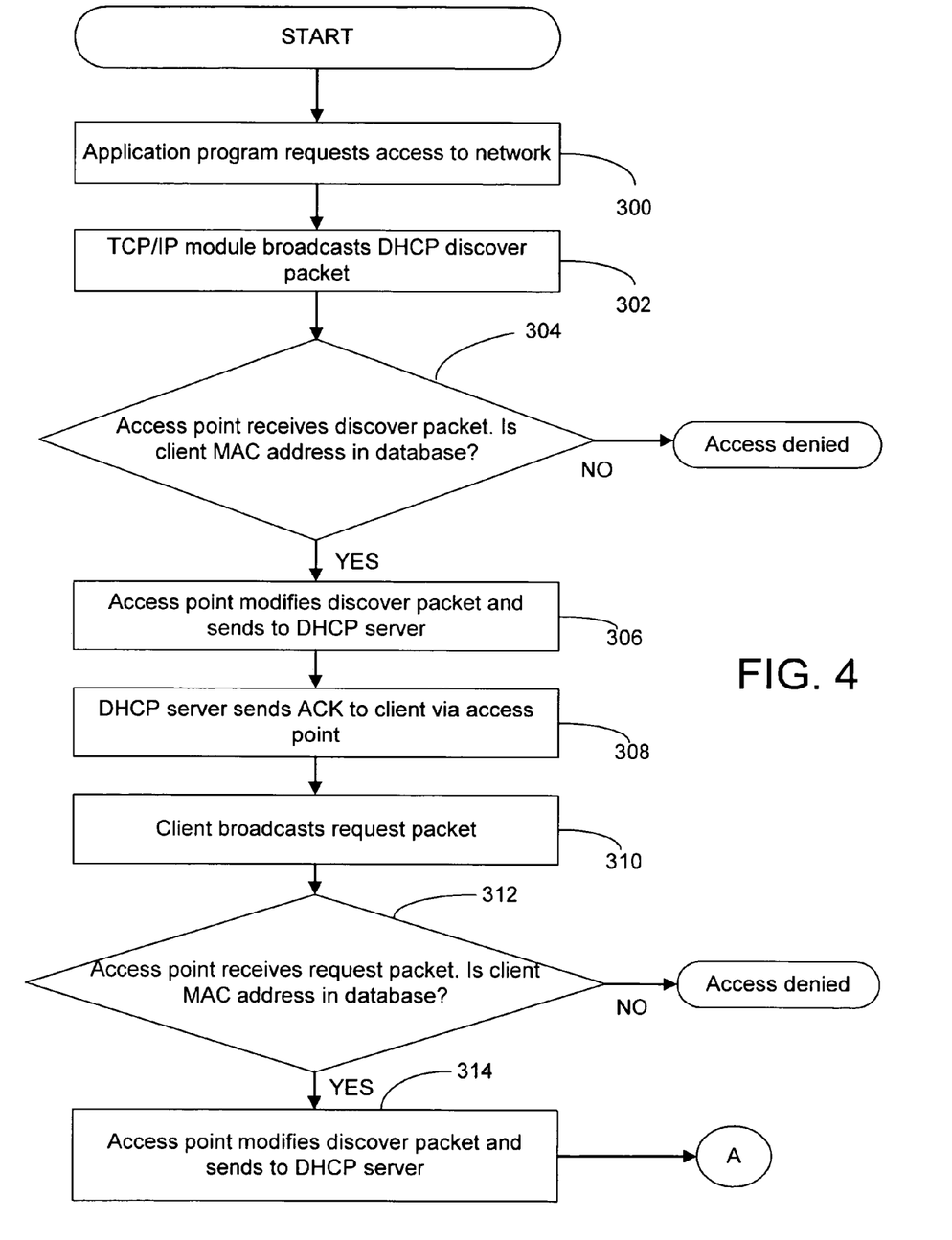
FIGS. 4-5 generally illustrate steps that may be taken to establish a secure link in accordance with an embodiment of the invention.
Figure 5:
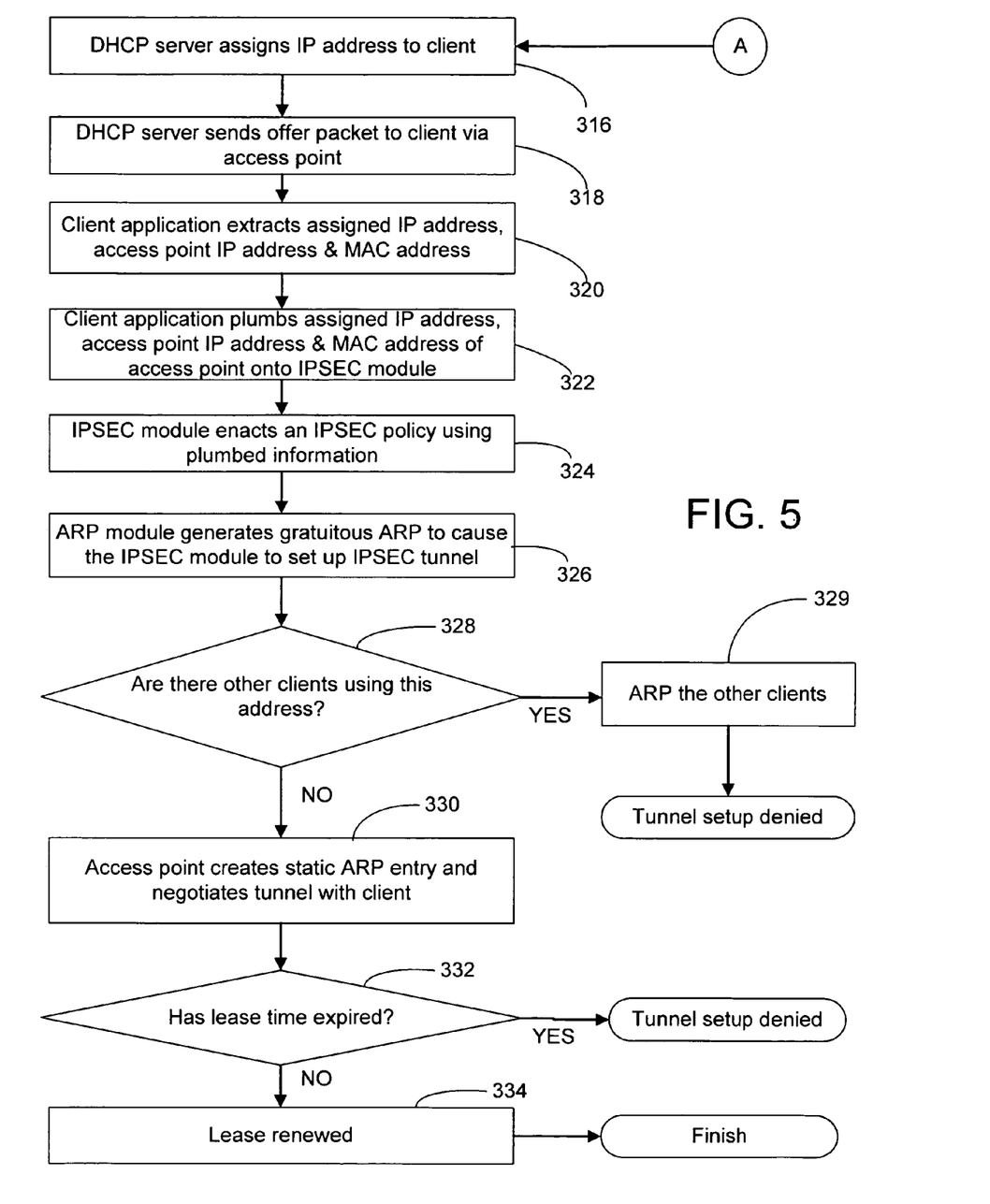
Figure 6:
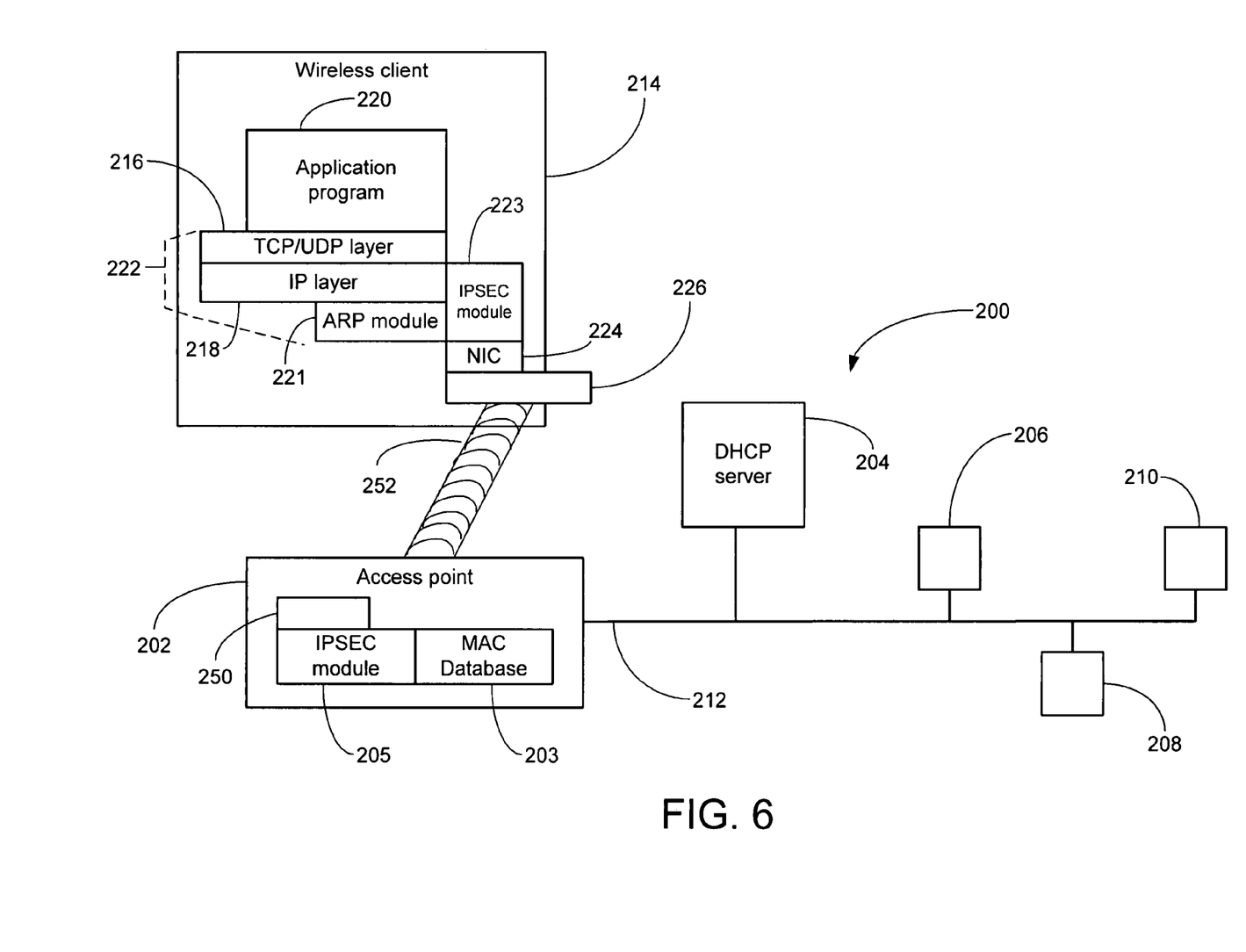
FIG. 6 generally illustrates the network of FIG. 3 following the execution of the steps of FIGS. 4-5.

To access the network 200 in accordance with a preferred embodiment of the invention, the wireless client 214 obtains a limited duration IP address from the DHCP server 204, negotiates an IPSEC tunnel with the access point 202, and, once the IPSEC tunnel is established, renews the IP address for a relatively long duration. Referring to FIGS. 4-6, a specific example of steps that may be followed to accomplish this procedure is shown. At step 300 of the flowchart of FIG. 4, the application program 220 on the wireless client 214 requests that a link be established with the network 200. The request is processed by the TCP/IP module 222, which generates a DHCP discover packet, and broadcasts the packet on the network 200 via the NIC 224 and the communicator 226 at step 302.

At step 304, the access point 202 receives the discover packet and examines its IP header. If the origin MAC address is not in the database 203, the access point 202 ignores the packet, thereby denying access to the network, and the procedure ends. If the origin MAC address is in the database 203, the access point 202 modifies the discover packet at step 306 by inserting data into an optional field of the packet to indicate that the packet originated from a wireless client. The access point 202 then transmits the modified discover packet to the DHCP server 204. At step 308, the DHCP server 204 responds to the discover packet with an ACK. The access point 202 relays the ACK to the client 214. At the client 214, the TCP/IP module 222 receives the ACK and responds to it by broadcasting a DHCP request packet via the NIC 224 and communicator 226 at step 310. At step 312, the access point 202 receives the request packet and checks to see whether the packet came from an authorized MAC address. If it did not, then the access point denies access, and the process ends. If it did, then at step 314 the access point 202 modifies the request packet in the same way it modified the discover packet (back at step 306) and sends the modified packet to the DHCP server 204.

At step 316 (FIG. 5), the DHCP server 204 assigns an IP address to the client 214. The IP address assigned preferably has a short lease time. One method that may be used to determine the lease time is that it should be approximately twice the time that it is expected to take for the client 214 to set up an IPSEC tunnel to the access point 202. For example, if it is expected to take one minute to set up the IPSEC tunnel, then the lease time could be around two minutes. At step 318, the DHCP server 204 generates a DHCP offer packet containing the assigned IP address. The DHCP server also inserts the IP address and MAC address of the access point 202 into an optional field of the offer packet. The DHCP server 204 sends the offer packet to the wireless client 214 via the access point 202.

At step 320, the application program 220 on the wireless client 214 receives the offer packet via the TCP/IP module 222. The application program 220 extracts the IP address assigned by the DHCP server 204, the IP address of the access point 202 and the MAC address of the access point 202 from the received offer packet. The application program 220 then "plumbs" or provides the access point's IP address and MAC address to the IPSEC module 223 at step 322. At step 324, the IPSEC module 223 enacts a policy in which all future transmissions using the IP address assigned by the DHCP server will be sent through an IPSEC tunnel to the access point 202.

According to a specific embodiment of the invention, this policy is hard-coded into the NIC 224, so that the IPSEC module 223 need only fill in the source IP address, the destination IP address, and the destination MAC address. The IPSEC module 223 may also ensure that IPSEC components such as encapsulating security payload (ESP), the authentication header (AH) and such additional security measures as 3DES, MD5 and certificates or CERTS are used in when communicating from that assigned IP address.

At step 326, the ARP module 221 generates a gratuitous ARP packet using the MAC address of the NIC 224 and the IP address assigned by the DHCP server 204 in the source IP address header. The ARP packet is created as a broadcast packet whose destination is the network 200 and is sent to the IPSEC module 223. In response to receiving the ARP packet, the IPSEC module 223 initiates the process of setting up an IPSEC tunnel with the access point 202, using a protocol such as OAKLEY. The IPSEC module 223 then drops the ARP packet.

At step 328, the access point 202 determines whether there are currently any other clients using the same IP address as the wireless client 214 but using a different mac address than that of the wireless client, and that are using or negotiating the use of access point 202 as an IPSEC tunnel endpoint. If there are, then the flow proceeds to step 329, at which the access point 202 sends an ARP down each of these existing tunnels. The access point will also broadcast an ARP to the rest of the network 200 to determine whether there are any other clients in the network using the same IP address as the wireless client 214.

If any other client, wireless or otherwise, responds to the ARP, then the access point 202 denies the establishment of the tunnel. Otherwise, the flow proceeds to step 330, at which the access point 202 creates a static ARP entry for the wireless client 214 in a data structure 250 (FIG. 6). The entry contains the IP address to MAC address mapping for the wireless client 214. The access point 202 may also modify and reuse a previously existing static ARP entry, provided the tunnel originally represented by the entry is no-longer valid. The access point 202 then negotiates with the wireless client 214 to set up an IPSEC tunnel 252.

Once the IPSEC tunnel 252 is established, the IP layer 218 of the wireless client 214 transmits a renewal request over the IPSEC tunnel. The access point 202 receives the renewal request packet, modifies it by inserting data into an optional field of the packet to indicate that the packet originated from an authenticated wireless client, and transmits the modified packet to the DHCP server. The DHCP server 204 receives the renewal request at step 332. If the lease on the IP address of the wireless client 214 has expired, then the DHCP server 204 informs the access point 202. The access point 202 then terminates the tunnel. Step 332 and its "YES" outcome may occur at any time after step 316, resulting in the termination of the process. At step 334, the DHCP server recognizes that the request came from an authenticated wireless client, and extends the lease on the IP address for a relatively long period of time—one day, for example. The process is then complete, and the wireless client 214 (FIG. 6) may now communicate with any of the computers 206, 208 and 210 via the IPSEC tunnel 252 and the access point 202.

It can thus be seen that a new and useful method and system for controlling access to a network by a wireless client has been described. In view of the many possible embodiments to which the principals of this invention may be applied, it should be recognized that the embodiments described herein with respect to the drawing figures is meant to be illustrative only and should not be taken as limiting the scope of the invention. It should also be recognized that the various steps involved in carrying out the methods described above as. well as the specific implementation of each step described above may be changed in ways that will be apparent to those of skill in the art.

Finally, those of skill in the art will recognize that the elements of the. illustrated embodiment shown in software may be implemented in hardware and vice versa, and that the illustrated embodiment can be modified in arrangement and detail without departing from the spirit of the invention. Therefore, the invention as described herein contemplates all such embodiments as may come within the scope of the following claims and equivalents thereof.

What is claimed is:

1. A method for controlling access to a network by a wireless client, the method comprising:
    assigning a network address to the wireless client, wherein the network address has a lease period;
    sending the assigned network address to the wireless client prior to establishing a secure link;
    establishing the secure link using the assigned network address;
    sending an address of a wireless access point to the wireless client, wherein the wireless access point is adapted to handle the secure link established by the wireless client; and
    wherein the lease period is based upon a time expected for setting up the secure link.

2. The method of claim 1, wherein the assigned network address and the wireless access point address are sent to the wireless client in a DHCP offer packet.

3. The method of claim 1, wherein the secure link is an IPSEC tunnel.

4. The method of claim 1, wherein the assigned network address is sent to the wireless client via the wireless access point.

5. The method of claim 1, wherein the address of the wireless access point that is sent to the wireless client comprises an IP address and a MAC address.

6. A computer-readable medium having stored thereon computer-executable instructions for performing the method of claim 1.

7. A computer-readable medium having stored thereon computer-executable instructions for performing the method of claim 2.

8. A computer-readable medium having stored thereon computer-executable instructions for performing the method of claim 3.

9. The method according to claim 1 wherein the assigned network address having the lease period is sent to the wireless client prior to authentication of the wireless client.

10. The method according to claim 1 wherein the lease period is of a duration that is sufficient for the wireless client to establish a secure link with the wireless access point and send a renewal request of the assigned address via the secure link.

11. The method according to claim 1 further comprising the step of extending the lease period of the assigned network address to a predefined duration if the wireless client establishes a secure link with the wireless access point and requests a renewal of the assigned address via the secure link.

12. A method for controlling access to a network by a wireless client, the method comprising:
    receiving a request for a network address from the wireless client at a network access point;
    attaching at the network access point information to the request to indicate that the request originated from a wireless client;
    relaying the request to the address server;
    receiving an assignment of an address from the address server, the address having a lease time;
    relaying the assignment of the address to the wireless client;
    negotiating the establishment of a secure link with the wireless client using the assigned address;
    using the assigned address to communicate with clients via a wireless access point; and
    wherein the lease time is based upon a time expected for setting up the secure link.

13. The method of claim 12, further comprising:
    broadcasting an ARP packet to check whether there are any other clients having the same assigned address of the wireless client; and
    if a response to the ARP packet is received, terminating the negotiation, thereby denying the wireless client access to the network.

14. The method of claim 12, further comprising:
    in response to the negotiation, creating an ARP entry that maps the assigned address of the wireless client to a MAC address of the wireless client.

15. The method of claim 12, wherein the request is a DHCP discover packet, the method further comprising: inserting data into an optional field of the packet to indicate that the packet was received from a wireless client; and relaying the packet to the address server.

16. The method of claim 12, further comprising:
    receiving a renewal request packet having a request for a renewal of the lease time from the wireless client;
    if the secure link is successfully negotiated with the wireless client, inserting data into an optional field of the renewal request packet to indicate that the renewal request packet was received from a wireless client; and
    relaying the renewal request packet to the address server.

17. A computer-readable medium having stored thereon computer-executable instructions for performing the method of claim 12.

18. A computer-readable medium having stored thereon computer-executable instructions for performing the method of claim 13.

* * * * *